Patented Oct. 3, 1950

2,524,727

UNITED STATES PATENT OFFICE 2,524,727

REACTION PRODUCTS OF AN ALDEHYDE AND A TRIAZINE DERIVATIVE

James R. Dudley, Darien, Conn., assignor to American Cyanamid Company, New York, N. Y., a corporation of Maine No Drawing. Application January 30, 1947, Serial No. 725,254

18 Claims. (Cl. 260—67.7)

This invention relates to the production of new synthetic materials and more particularly to new reaction products which are especially suitable for use in the plastics and coating arts. The invention specifically is concerned with compositions of matter comprising the product of reaction of ingredients comprising (1) an aldehyde, including polymeric aldehydes, hydroxyaldehydes and aldehyde-addition products, e. g., formaldehyde, para-formaldehyde, dimethylol urea, trimethylol melamine, glycollic aldehyde, etc., and (2) a compound represented by the general formula I
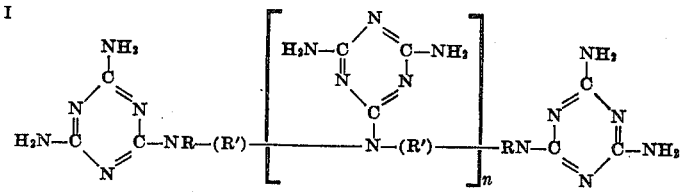

where R represents a member of the class consisting of hydrogen and monovalent hydrocarbon radicals, R' represents a divalent hydrocarbon radical bonded through carbon to nitrogen, and $n$ represents one of the following: 0, a small whole number (e. g., 1, 2, 3, 4, 5, etc.). When $n$ is 0, the triazine derivative contains only two s-triazinyl (1,3,5-triazinyl) nuclei.

Illustrative examples of monovalent hydrocarbon radicals which R in the above formula may represent are: aliphatic (e. g., methyl, ethyl, propyl, isopropyl, butyl, isobutyl, sec.-butyl, butenyl, amyl, isoamyl, hexyl, octyl, decyl, dodecyl, octadecyl, allyl, methallyl, crotyl, oleyl, linalyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, 2-butenylphenyl, tert-butylphenyl, etc.); and aryl-substituted aliphatic (e. g., benzyl, cinnamyl, phenylethyl, phenylpropyl, etc.). Illustrative examples of divalent hydrocarbon radicals which R' in the above formula may represent are: divalent aliphatic, e. g., ethylene, propylene (trimethylene) propenylene, butylene, isobutylene, pentylene, isopentylene, decamethylene, etc., including divalent cycloaliphatic, e. g., cyclopentylene, cyclcpentenylene, cyclohexylene, cyclohexenylene, cycloheptylene, etc.; divalent aromatic, e. g., phenylene, biphenylene, naphthylene, etc.; divalent aliphatic-substituted aromatic, e. g., 2,4-tolylene, ethyl-2,5-phenylene, isopropyl-3,4-phenylene, 1-butyl-2,4- naphthylene, etc.; divalent aromatic-substituted aliphatic, e. g., phenylethylene, phenylpropylene, naphthyl-isobutylene, xlylene, alpha-(4-tolylene) beta'-butyl, etc.; and radicals that may be classed either as divalent aromatic-substituted aliphatic or divalent aliphatic-substituted aromatic, e. g., 4,alpha-tolylene, 3,beta-phenyleneethyl, 4,alpha-xylylene, 2,gamma-phenylenebutyl, etc. This, R' may represent a divalent hydrocarbon radical represented by the formula —Ar—R''—Ar— where Ar represents an arylene radical and R'' represents an alkylene radical. It will be noted that the foregoing illustrative examples of divalent hydrocarbon radicals represented by R' include such radicals which contain from 2 to 14 carbon atoms, inclusive, and that these examples specifically include alkylene radicals which contain from 2 to 10 carbon atoms, inclusive.

When $n$ in Formula I represents 0 the triazine derivatives used in practicing the present invention may be represented by the general formula II
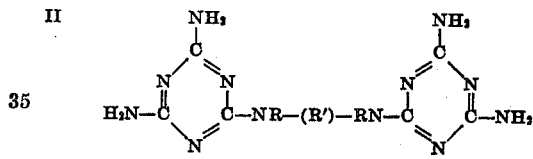

where R and R' have the same meanings as given above with reference to Formula I.

Examples of triazine derivatives that may be used in carrying the present invention into effect are the alkylenedimelamines (e. g., ethylenedimelamine, the propylenedimelamines, the butylenedimelamines, the pentylenedimelamines, hexamethylenedimelamine, decamethylenedimelamine, etc.); the arylenedimelamines (e. g., the phenylenedimelamines, the naphthylenedimelamines, the biphenylenedimelamines, etc.); the aryl-substituted alkylenedimelamines (e. g., phenylethylenedimelamines, phenylpropylenedimelamines, naphthylisobutylenedimelamines, xylylenedimelamines, etc.); the alkyl-substituted arylenedimelamines (e. g., 2,4-tolylenedimelamines, ethyl-2,5-phenylenedimelamines, isopropyl-3,4-phenylenedimelamines, etc.); the tri-alkylene and triarylene tetramelamines, the tetralkylene and tetrarylene pentamelamines, the pentalkylene and pentarylene hexamelamines, the hexalkylene and hexarylene heptamelamines, etc., and the corresponding aromatic-substituted alkylene and aliphatic-substituted arylene polymelamines, examples of all of which will be apparent from the foregoing examples of the dimelamines and from the first and second paragraphs of this specification.

More specific examples of triazine derivatives that may be used in practicing my invention, all of which are embraced by Formula I, are listed below:

Ethylenedimelamine
Diethylenetrimelamine
Triethylenetetramelamine
Tetraethylenepentamelamine
Pentaethylenehexamelamine
Hexaethyleneheptamelamine
1,3-cyclohexylenedimelamine
1,2-butylenedimelamine
1,4-butylenedimelamine (tetramethylenedimelamine)
1,5-pentylenedimelamine
o-, m- and p-Phenylenedimelamines
1,2-propylenedimelamine
1,4-naphthylenedimelamine
1,4-anthrylenedimelamine
3,3'-biphenylenedimelamine
Hexamethylenedimelamine
Octamethylenedimelamine
Decamethylenedimelamine
Octadecamethylenedimelamine
Butenylenedimelamines
Dibutenylenedimelamines
Pentenylenedimelamines
4,4'ditylenedimelamine
2 - N,2' - N' - dicyclohexyl - 2 - N,2' - N' - ethylenedimelamine
2 - N,2' - N' - diphenyl - 2 - N,2' - N' - ethylenedimelamine
2 - N,2' - N' - dibutyl - 2 - N,2'-N-phenylenedimelamine
2-N,2'-N'-diallyl-2-N,2'-N'-ethylenedimelamine
2 - N,2' - N' - diisopropyl - 2 - N,2' - N' - trimethylenedimelamine
2 - N,2' - N' - dicyclopentenyl - 2-N,2' - N' - trimethylenedimelamine
2 - N,2' - N' - dicinnamyl - 2 - N,2' - N' - tetramethylenedimelamine
2 - N,2' - N' - dibenzyl - 2 - N,2' - N' - pentamethylenedimelamine
2 - N,2' - N',2'' - N'' - trimethyl - 2 - N,2'- N',2''-N''-diethylenetrimelamine
1,2,3 - tris - (2',4' - diamino - 1',3',5' - triazinylamino)-propane
1,2,3 - tris - (N - 2',4' - diamino - 1',3',5' - triazinyl-N-ethylamino)-propane
1,3,5 - tris - (2',4' - diamino - 1',3',5' - triazinylamino)-pentane
1,3,5,7 - tetrakis - (2',4' - diamino - 1',3',5' - triazinylamino)-heptane
1,3,5,7 - tetrakis - (N - 2',4' - diamino - 1',3',5'- triazinyl-N-allylamino)-heptane
1,3,5,7,9 - pentakis - (N - 2',4' - diamino - 1',3',5'- triazinylamino)-nonane
1,3,5,7,9 - pentakis - (N - 2',4' - diamino - 1',3',5'- triazinyl-N-phenylamino)-nonane Reference is made to my copending application Serial No. 725,253, filed concurrently herewith, for additional examples of compounds that may be employed. The triazine derivatives that are used in practicing the present invention are more fully described (including methods of preparation) and are specifically claimed in the aforesaid copending application.

The present invention is based on my discovery that new and valuable materials having particular utility in the plastics and coating arts can be produced by effecting reaction between ingredients comprising essentially an aldehyde, including polymeric aldehydes, hydroxyaldehydes and aldehyde-addition products, and a triazine derivative of the kind embraced by Formula I, numerous examples of which have been given above and in my copending application Serial No. 725,253. Due to the numerous reactive positions in the triazine derivatives employed in practicing my invention, cured resinous aldehyde-reaction products prepared therefrom are outstanding in their resistance to water and organic solvents. The gloss and general appearance of molded articles made from molding compounds containing these new resins in heat-convertible state and of cured coating compositions containing the said resins also are exceptionally good. Other improved properties, including improved plasticity combined with rapid curing characteristics even in the absence of a curing agent and, also, high resistance to heat and abrasion in the cured state, make the products of the present invention suitable for use in fields of utility, for instance in electrically insulating and coating applications, for which resinous materials of lesser resistance to heat, water, abrasion and organic solvents would be wholly unsuited.

It was suggested prior to my invention, for instance, in the copending application of J. T. Thurston, Serial No. 409,149, filed August 30, 1941, now Patent No. 2,423,353, issued July 1, 1947, that resinous materials could be prepared by reacting formaldehyde with a diaguanamine represented by the formula G—R—G in which R is an alkylene radical and G is a guanamine radical having a free valence on the 2-carbon atom of the triazine ring, the bond between G and R in each case beong a carbon-to-carbon bond. Examples of diguanamines embraced by the above formula are malonoguanamine, succinoguanamine, glutaroguanamine, adipoguanamine and sebacoguanamine, which diguanamines also are disclosed in, for example, Thurston Patent No. 2,394,526, issued February 5, 1946. The triazine derivatives used in practicing the present invention differ from the aforementioned diguanamines in that in the former the diamino s-triazinyl nuclei are linked by a divalent hydrocarbon radical which is bonded through carbon thereof to nitrogen atoms which, in turn, are each attached to a carbon atom of a triazine nucleus. Hence the triazine derivatives employed in carrying my invention into effect have a higher nitrogen content than the aforementioned diguanamines. As a result, the resins made therefrom also have a higher nitrogen content and, mainly in view thereof, have better arc resistance than diguanamines of the kind described above. This is especially true of the tri and higher polymelamines, which also contain a greater number of amino groups that are reactive with an aldehyde, e. g., formaldehyde, than the aforementioned diguanamines and hence yield resins having new and improved properties, e. g., faster curing, as compared with diguanamine-aldehyde resins.

It was also suggested prior to my invention that resins be prepared by reacting an aldehyde with a bis-triazinyl carbazide or thiocarbazide. In such triazine derivatives the grouping

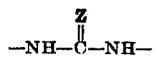

where Z represents oxygen or sulphur, is bonded to nitrogen atoms which, in turn, are each attached to a carbon atom of a triazine nucleus. Resins made from such a carbazide or thiocarbazide lack the internal plasticity of my new resins, since they contain no divalent hydrocarbon radical, e. g., a long-chain alkylene radical, linking the triazine nuclei. The tri and higher polymelamines used in practicing my invention also contain a greater number of amino groups which are reactive with an aldehyde than the aforementioned carbazides and thiocarbazides, thereby yielding resins having a faster curing rate and other improved properties as compared with the aforementioned bis-triazinyl carbazide-aldehyde and thiocarbazide-aldehyde resins.

In practicing my invention the initial condensation reaction between the reactants may be carried out at normal or at elevated temperatures, at atmospheric, subatmospheric or superatmospheric pressures, and under neutral, alkaline or acid conditions. Any substance yielding an alkaline or an acid aqueous solution may be used in obtaining alkaline or acid conditions for the initial condensation reaction. For example, I may use an alkaline substance such as sodium, potassium or calcium hydroxide, sodium or potassium carbonate, a mono-, di- or tri-amine, aqueous ammonia, etc. Illustrative examples of acid condensation catalysts that may be employed are inorganic and organic acids, e. g., hydrochloric, sulfuric, phosphoric, acetic, lactic, acrylic, phthalic, maleic, etc., or acid salts such as sodium acid sulfate, monosodium phosphate, monosodium phthalate, etc. Mixtures of acids, of acid salts or of acids and acid salts may be employed if desired.

The reaction between the aldehyde, e. g., formaldehyde, and the triazine derivative may be carried out in the presence of solvents or diluents, other natural or synthetic bodies (numerous examples of which hereafter are given), or while admixed with other materials which are reactable or non-reactable with the aldehydic reactant or with the triazine derivative, e. g., urea, thiourea, cyanamide, dicyandiamide, terephthalic diamide, acetamide, chlorinated acetamides, methyl ethyl ketone, etc.; aldehyde-reactable triazinyl compounds other than the triazine derivatives used in practicing the present invention, e. g., melamine, ammeline, ammelide, etc.; urea, thiourea and aldehyde-reactable substituted ureas and thioureas, e. g., methyl urea, mono- and dimethylol ureas and thioureas, acetyl urea, allyl urea, phenyl urea and thioureas, guanyl urea, diethyl urea, dibenzyl thiourea, dimethyl thiourea, etc.; phenol and substituted phenols, e. g., the cresols, the xylenols, the tertiary-alkyl phenols, etc.; monohydric and polyhydric alcohols, e. g., butyl alcohol, amyl alcohol, heptyl alcohol, n-octyl alcohol, 2-ethyl-hexyl alcohol, ethylene glycol, propylene glycol, glycerine, polyvinyl alcohol, polyallyl alcohol, etc.; amines, including propyl amine, dibutyl amine, aniline, etc.; cyanuric triesters, for instance, cyanuric triesters of a primary, ethylenically unsaturated monohydric alcohol containing at least 3 and not more than 10 carbon atoms, e. g., triallyl cyanurate, trimethallyl cyanurate, etc.; and the like.

The modifying reactants may be incorporated with the triazine derivative and the aldehyde to form an intercondensation product by mixing all the reactants and effecting condensation therebetween under acid, alkaline or neutral conditions, or by various permutations of reactants. For example, I may effect partial reaction or condensation between the chosen aldehyde and the triazine derivative under acid, alkaline or neutral conditions, then add the modifying reactant, e. g., urea, melamine, n-butanol, etc., and effect further condensation under acid, alkaline or neutral conditions. Or, I may first partially react urea, melamine or other aldehyde-reactable modifying reactant with a molecular excess of an aldehyde under acid, alkaline or neutral conditions, then add the triazine derivative and effect further condensation under the same or different conditions of acidity or alkalinity. Or, I may separately partially react (1) urea, melamine or other aldehyde-reactable modifying reactant and an aldehyde and (2) a triazine derivative of the kind embraced by Formula I and an aldehyde, thereafter mixing the two products of partial reaction and effecting further reaction or condensation therebetween. The reactants of (1) and (2) may be partially condensed under acid, alkaline or neutral conditions.

In producing my new products, the choice of the aldehyde is dependent largely upon economic considerations and the particular properties desired in the finished product. I prefer to use as the aldehydic reactant formaldehyde or compounds engendering formaldehyde, e. g., paraformaldehyde, hexamethylenetetramine, trioxane, etc. Illustrative examples of other aldehydes that may be employed are acetaldehyde, propionaldehyde, butyraldehyde, heptaldehyde, octaldehyde, acrolein, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives, of urea, thiourea, iminourea, and of substituted ureas, thioureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, of the aminodiazines, etc. Good results are obtained with aldehyde-addition products such as a methylol urea, more particularly mono- and dimethylol ureas, and a methylol melamine, e. g., di-, tri-, tetra-, penta- and hexamethylol melamines. Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the triazine derivative may be varied over a wide range depending, for example, upon the number of aldehyde-reactable amino and imino groups in the triazine derivative and upon the particular properties desired in the finished product. The aldehyde, e. g., formaldehyde, is used in an amount sufficient to react with from one to all of the reactive amino and imino groups in the triazine derivative. Ordinarily these reactants are employed in an amount corresponding to at least 1 mol of the aldehyde, specifically formaldehyde, for each mol of the triazine derivative. Thus, depending upon the particular triazine derivative employed, I may use, for instance, from 1 to 30 or more mols of aldehyde for each mol of the triazine derivative. Good results are obtained when the aldehyde is used in an amount corresponding to from about 1 to 2 mols thereof for each amino and imino grouping in the triazine derivative. When the aldehyde is available for reaction in the form of an alkylol derivative, more particularly a methylol derivative, e. g., dimethylol urea, trimethylol melamine, etc., amounts of such alkylol derivatives corresponding to or higher (e. g., from a few per cent more to 15 or 20 times as much) than the relative amounts mentioned above with reference to the aldehyde may be employed.

Some of the condensation products of this invention are thermoplastic materials even at an advanced stage of condensation (e. g., when certain aldehydes or modifiers are used), while others are thermosetting or potentially thermosetting bodies that convert under heat or under heat and pressure to a substantially insoluble, substantially infusible state. The thermoplastic products are of particular value as plasticizers for other synthetic resins that have unsatisfactory plasticity or flow characteristics. The thermosetting or potentially thermosetting resinous materials, alone or mixed with fillers, pigments, dyes, plasticizers, lubricants, curing agents, etc., may be used, for example, in the production of molding compositions. The liquid intermediate reaction products of this invention may be concentrated or diluted further by the removal or addition of volatile solvents to form, for example, liquid coating, laminating and adhesive compositions of adjusted viscosity and concentration. The heat-convertible or potentially heat-convertible reaction products may be used in liquid state, for instance, in the production of surface-coating materials such, for example, as paints, varnishes, lacquers, enamels, etc., for general adhesive applications, in producing laminated articles and for numerous other purposes. The liquid heat-hardenable or potentially heat-hardenable reaction products also may be used directly as casting resins, while those which are of a gel-like nature in partially reacted state may be dried and granulated to form clear, unfilled, heat-convertible resins.

In order that those skilled in the art better may understand how the present invention may be carried into effect, the following examples are given by way of illustration and not by way of limitation. All parts are by weight.

*Example 1*

| | Parts |
|---|---|
| Ethylenedimelamine | 278 |
| Aqueous formaldehyde (approx. 37% HCHO) | 810 | are mixed together, and the mixture adjusted to a pH of 8 by adding a 10% aqueous solution of sodium hydroxide. The alkaline mixture is allowed to react, with agitation, at room temperature (20° to 30° C.) for about 16 hours, yielding a heavy, paste-like reaction product in which about 7 mols of formaldehyde per mol of ethylenedimelamine are combined.

*Example 2*

| | Parts |
|---|---|
| Ethylenedimelamine | 556 |
| Aqueous formaldehyde (approx. 37% HCHO) | 972 |
| Water | 1,000 |

The above-stated amount of ethylenedimelamine is mixed with 1000 parts of water to yield a slurry, which is heated to boiling and then made slightly alkaline with a 10% aqueous NaOH solution. To the boiling slurry is added 972 parts of aqueous formaldehyde, and the mixture is heated for a few minutes to yield a clear solution. The solution is cooled, filtered and allowed to stand for about 40 hours at room temperature, yielding a solid reaction product of formaldehyde and the ethylenedimelamine, which reaction product comprises mainly the methylol derivative of ethylenedimelamine. This reaction product is broken up and air dried. It resinifies under heat.

*Example 3*

| | Parts |
|---|---|
| Ethylenedimelamine | 278 |
| Aqueous formaldehyde (approx. 37% HCHO) | 810 | are mixed together, and the mixture adjusted to a pH of 8 by adding a 10% aqueous solution of sodium hydroxide. The alkaline mixture is heated under reflux at the boiling temperature of the mass for 30 minutes, yielding a resinous syrup. This syrup is potentially heat-curable, as evidenced by the fact that when a small amount of a curing agent is incorporated into samples thereof, e. g., about 1% by weight thereof of phthalic anhydride, sulfamic acid, maleic acid, maleic anhydride, melamine pyrophosphate, etc., and the resulting syrup is heated on a 140° C. hot plate, it cures to a substantially insoluble, substantially infusible state.

To the main batch of syrupy reaction product is now added maleic acid in an amount sufficient to bring the syrup to a pH of about 3 to 4. The resulting syrup is heated for a few minutes more in order to incorporate the maleic acid thoroughly therein.

The resulting syrup is mixed with 195 parts of alpha-cellulose in flock form and 2 parts of a mold lubricant, specifically zinc stearate, to form a molding (moldable) composition. The wet molding compound is dried at 60° C. until sufficient moisture has been removed so that the composition can be molded satisfactorily. A sample of the dried and ground molding compound is molded for 5 minutes at 135° C. under a pressure of 2000 pounds per square inch. The molding compound shows good plastic flow during molding. The molded article is white, hard, well-cured, has an excellent gloss and surface finish, and also excellent arc and water resistance.

*Example 4*

| | Parts |
|---|---|
| Ethylenedimelamine | 55.6 |
| Aqueous formaldehyde (approx. 37% HCHO) | 130.0 |
| n-Butanol | 125.0 | are heated together for about 20 minutes, yielding a clear solution to which is then added 75 parts of n-butanol having dissolved therein 0.3 part of phosphoric acid. After heating for an additional 14 minutes to a temperature of 91° C., more butanol is added to replace the volatile matter which distills and thereby to keep constant the volume of the reaction mass. Heating is continued at atmospheric pressure for about one hour at about 91° to 99° C., adding more butanol from time to time as required. At the end of this period further heating is continued under reduced pressure for 18 minutes at about 90° C. to obtain a liquid resinous composition containing about 48% of resin solids as determined by heating a sample of the liquid resin for 2 hours at 105° C. and noting the loss in weight. The liquid resin is thinned with butanol to yield a product containing about 40% of resin solids, and is then filtered.

The filtered resin has a Gardner-Holdt viscosity at 78° F. of $Z_1$—$Z_2$ and has excellent mineral spirits tolerance (3.4 cc. of Varsol No. 1 per gram of resin solution), being better in this respect than conventional butylated melamine-formaldehyde liquid resins. The liquid resin and coating compositions containing the same also have improved curing characteristics, e. g., faster curing at a relatively low temperature, than the aforementioned melamine-formaldehyde resins.

A furniture finishing composition is prepared by compounding 50 parts of the filtered resin solution with 40 parts of a xylene solution of soya bean oil-modified glyceryl phthalate resin and 10 parts of a solution of a maleic-type adduct of rosin (softening point of 140°–155° C., acid number of 300–330). Such compositions cure more thoroughly, and the cured finishes have better scratch hardness, "top tack," alcohol resistance and sanding qualities than similar compositions in which a conventional butylated melamine-formaldehyde resin is incorporated. The cure rate of such compositions is accelerated by adding a curing catalyst, e. g., phosphoric acid in an amount corresponding to about 5% by weight of the resin solids in the butylated ethylenedimelamine-formaldehyde liquid resin.

A white baking enamel is made from a mixture of a solution in xylene of soya bean oil-modified glyceryl phthalate resin and the liquid resin of this example (40% resin solids in butanol) in the ratio of 3 parts of the former to 1 part of the latter, based on the amount of resin solids present in each. Titanium dioxide is incorporated into the enamel so that the enamel has a 1 to 1 pigment-to-vehicle ratio. The enamel is thinned with a 1 to 1 mixture of xylene and butanol, and then sprayed on bare steel panels. The Sward hardnesses of the baked enamels under different baking schedules are as follows:

| Baking conditions: | Sward hardness |
|---|---|
| ½ hour at 200° F. | 32 |
| 1 hour at 200° F. | 38 |
| 1 hour at 150° F. | 18 |
| 2 hours at 150° F. | 24 |

The same improvements in properties of the baked white enamel are observed as in the case of furniture finishes. The gloss of the enamel baked at 150° F. is somewhat better than that of the same enamel baked at 200° F.

Example 5

| | Parts |
|---|---|
| Ethylenedimelamine | 27.8 |
| Acrolein | 44.8 |
| Water | 100.0 | are heated together under reflux at the boiling temperature of the mass for 15 minutes. The resinous material which separates is heat-curable, as shown by the fact that a sample thereof is converted to a substantially insoluble, substantially infusible state upon heating on a 140° C. hot plate. The resinous composition of this example may be used, for instance, in the production of molding compositions.

Example 6

| | Parts |
|---|---|
| Ethylenedimelamine | 139 |
| Urea | 30 |
| Aqueous formaldehyde (approx. 37% HCHO) | 324 | are mixed together, and the mixture adjusted to a pH of 8 by adding a 10% aqueous solution of sodium hydroxide. The alkaline mixture is heated under reflux at the boiling temperature of the mass for 30 minutes, yielding a resinous syrup. This syrup is potentially heat-curable as shown by the fact that when a small amount of a curing agent, e. g., phthalic anhydride or other curing agent such as mentioned under Example 3 is incorporated in a sample, the syrup cures to a substantially insoluble, substantially infusible state when heated on a 140° C. hot plate.

The resinous syrup of this example may be used in the production of molding compounds and molded articles as described under Example 3. It also may be employed in the preparation of, for example, coating, laminating, adhesive and impregnating compositions.

Example 7

Thirteen and nine-tenths (13.9) parts of ethylenedimelamine is added to 16.2 parts of aqueous formaldehyde, 10 parts of 37% aqueous hydrochloric acid and 39.5 parts of water. The acid mixture is allowed to react, with agitation, at room temperature (20° to 30° C.) for about 16 hours. The resulting syrup may be used, for example, as an addition agent to paper during its manufacture in order to increase its wet-strength characteristics.

Example 8

| | Parts |
|---|---|
| Diethylenetrimelamine | 172.0 |
| Aqueous formaldehyde (approx. 37% HCHO) | 388.8 |
| n-Butanol | 400.0 | are heated together for about 23 minutes to a temperature of about 91° C., yielding a clear solution. Heating is continued for 2 hours and 50 minutes at 91° to 100° C., additional butanol being added from time to time to replace the distilled volatile matter and thereby to keep constant the volume of the reaction mass. At the end of this period further heating is continued under reduced pressure for about 28 minutes at about 90° to 100° C., yielding 486 parts of butylated diethylenetrimelamine-formaldehyde resin. To this liquid resin is added 114 parts of xylene. The thinned resin contains about 54% of resin solids. It is further diluted with xylene to 50% resin solids, and is then filtered.

The filtered resin, which contains about 25% of butanol and 25% of xylene, has a Gardner-Holdt viscosity at 78° F. of Z and has exceptionally good mineral spirits tolerance (6.35 cc. of Varsol No. 1 per gram of resin solution). A white baking enamel is prepared from the filtered resin and applied to bare steel panels as described under Example 4. The Sward hardnesses of the baked enamel under different baking schedules are as follows:

| Baking conditions: | Sward hardness |
|---|---|
| ½ hour at 200° F. | 24 |
| 1 hour at 200° F. | 30 |
| 1 hour at 150° F. | 14 |
| 2 hours at 150° F. | 18 |

The properties are in general the same as the baking enamel described under Example 4.

Example 9

| | Parts |
|---|---|
| Diethylenetrimelamine | 43.0 |
| Furfural | 96.0 |
| Ethylene glycol | 150.0 | are heated together under reflux at the boiling temperature of the mass for 30 minutes, yielding a brownish, resinous syrup. This syrup is poured into a relatively large volume of water, and the precipitated resin is dried at 60° C. The dry resin is blended 50-50 with wood flour and a small amount of a curing agent, e. g., maleic anhydride, to form a molding composition which may be further heated, if desired, to advance the cure of the resin prior to molding.

Example 10

Twenty-one and one-half (21.5) parts of diethylenetrimelamine is added to a mixture of 24.3 parts of 37% aqueous formaldehyde, 11.25 parts of concentrated hydrochloric acid and about 146 parts of water. The mixed ingredients are thoroughly agitated at room temperature until the trimelamine has dissolved. The reaction is allowed to proceed at room temperature for 1 week, yielding a gel.

Example 11

| | Parts |
|---|---|
| Decamethylenedimelamine | 89.7 |
| Aqueous formaldehyde (approx. 37% HCHO) | 149.0 |
| n-Butanol | 368.0 |

The above-stated amount of decamethylenedimelamine is added to the butanol, the mixture is heated to 110° C., then cooled to 100° C., after which the aqueous formaldehyde is added thereto. The addition of the formaldehyde reduces the temperature from 100° to 85° C. After holding at this temperature for 5 minutes, heating is continued under reduced pressure for about 25 minutes at 53° to 85° C., additional butanol being added to replace the volatile matter which distills and to keep constant the volume of the reaction mass. The liquid resinous reaction product is then concentrated by further heating under reduced pressure for about 1 hour at 53° to 73° C., yielding 225 parts of a liquid resin containing about 71.4% of resin solids. This liquid resin is thinned first with butanol to about 67% resin solids, then with xylene to about 30% resin solids, after which it is filtered. The filtered liquid resin contains about 15% butanol and 55% xylene, and has a Gardner-Holdt viscosity at 78° F. of M–N.

A white baking enamel is prepared from the above liquid resin as described under Example 4 with the exception that the soya bean oil-modified alkyd resin is used in the ratio of 4 parts of the alkyd resin solution to 1 part of the resin solution of this example, based on the amount of resin solids present in each. The Sward hardness of the enamel after baking at 250° F. for 15 minutes is 34. When 0.005% cobalt in the form of, for example, cobalt naphthenate is incorporated in the enamel, the Sward hardness after baking for 2 hours at 200° F. is 42. The baked enamel having a Sward hardness of 34 is harder, tougher and has better acid resistance than a similar enamel in which is utilized a conventional butylated melamine-formaldehyde resin, and is equal to the latter in alkali resistance and gloss.

Example 12

| | Parts |
|---|---|
| Ethylenedimelamine | 139 |
| Melamine | 126 |
| Aqueous formaldehyde (approx. 37% HCHO) | 568 | are mixed together, and the mixture adjusted to a pH of 8 by adding a 10% aqueous solution of sodium hydroxide. The alkaline mixture is heated under reflux at the boiling temperature of the mass for 30 minutes, yielding a resinous syrup. This syrup is potentially heat-curable as shown by the fact that when a small amount of a curing agent, e. g., maleic anhydride, phthalic acid or other curing agent such as mentioned under Example 3 is incorporated in a sample, the syrup cures to a substantially insoluble, substantially infusible state when heated on a 140° C. hot plate.

The resinous syrup of this example may be used in the production of molding compounds and molded articles as described under Example 3. It also may be employed in the preparation of, for example, coating, laminating, adhesive and impregnating compositions.

Example 13

| | Parts |
|---|---|
| Diethylenetrimelamine | 43.0 |
| Methacrolein | 70.0 |
| Water | 150.0 | are heated together under reflux at the boiling temperature of the mass for 15 minutes. A heat-curable resinous material is obtained. This resin converts to a substantially insoluble, substantially infusible state upon heating on a 140° C. hot plate.

Example 14

| | Parts |
|---|---|
| Ethylenedimelamine | 41.7 |
| Glycerine | 13.7 |
| Aqueous formaldehyde (approx. 37% HCHO) | 60.8 | are mixed and adjusted to a pH of 8.0 by adding a 10% aqueous solution of sodium hydroxide. The alkaline mixture is heated under reflux at the boiling temperature of the mass for 10 minutes, yielding a viscous solution of a partially resinified mass. The solution is dehydrated, yielding a resinous syrup which is potentially heat-curable. When a small amount of a curing agent such as mentioned under Example 3 is incorporated into the initial viscous solution or into the dehydrated syrup, the material cures to a substantially insoluble, substantially infusible state upon heating on a 140° C. hot plate. The resinous composition of this example may be used in the preparation of liquid coating and impregnating compositions.

Example 15

| | Parts |
|---|---|
| Ditylenedimelamine | 208 |
| Aqueous formaldehyde (approx. 37% HCHO) | 972 | are heated together under reflux at the boiling temperature of the mass for 1½ hours, yielding a resinous syrup, which may be used in the production of molding compounds or in the preparation of coating, adhesive and other compositions.

It will be understood, of course, by those skilled in the art that my invention is not limited to the specific reactants nor to the specific conditions of reaction shown in the above illustrative examples. Thus, instead of formaldehyde, furfural, acrolein or methacrolein, any other aldehyde or compound engendering an aldehyde, numerous examples of which have been given hereinbefore, may be employed. Also, I may use instead of the particular polymelamines specified in the various examples, any of the other polymelamines embraced by Formula I or mixture thereof with each other or with any of the polymelamines named in the examples. The reaction may be effected at temperatures ranging from room temperature to the fusion or boiling temperature of the mixed reactants, the reaction proceeding more slowly at normal temperature than at elevated temperatures in accordance with the general law of chemical reactions.

The curing of the thermosetting or potentially thermosetting resinous composition of this invention may be accelerated by incorporating therein a curing agent (or mixture of curing agents), for instance, a direct or active curing catalyst (e. g., phthalic acid, phthalic anhydride, maleic acid, maleic anhydride, succinic acid, tartaric acid, citric acid, etc.), or a latent curing catalyst (e. g., an ammonium salt of phosphoric acid, ammonium chloride, ammonium silicofluoride, ammonium borofluoride, benzoyl mercaptobenzothiazole, ammonium salt of toluene sulfonic acid, phthaloyl mercaptobenzothiazole, benzoyl phthalimide, etc.). Catalysts which are capable of intercondensing with the partial reaction product may be employed, for instance, curing reactants such as glycine, sulfamic acid, chloroacetone, mono-, di- or trichloroacetamides, chloroacetyl urea, etc. The amount of curing catalyst, if used, may be varied as desired or as conditions may require, but ordinarily is within the range of 0.1 to 5 or 6 per cent by weight of the neutral, thermosetting or potentially thermosetting resinous composition.

As indicated hereinbefore and as further shown by a number of the examples, the properties of the fundamental resins of this invention may be varied widely by introducing other modifying bodies before, during or after effecting condensation between the primary components. Thus as modifying agents I may use, for instance, monohydric alcohols, e. g., methyl, ethyl, propyl, butyl, hexyl, n-octyl, 2-ethylhexyl, decyl, dodecyl, cetyl, lauryl, capryl, or tetrahydrofurfuryl alcohol, pentanol or mixtures of isomeric pentanols, (which mixtures also may include n-pentanol), cyclohexanol, methylcyclohexanol, etc.; polyhydric alcohols, e. g., glycerol, pentaerythritol, dipentaerythritol, trimethylol propane, mannitol, sorbitol, ethylene glycol, diethylene glycol, butylene glycol, neopentyl glycol, 2-butene-1, 4-diol, 2-butyne-1,4-diol, 2-butyloctanediol-1,3, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., cyanamide, dicyandiamide, stearamide, acrylamide, benzamide, phthalamide, benzene sufonamides, toluene sulfonamides, etc.; amines, e. g., ethylene diamine, phenylene diamine, triethylene tetramine, etc.; ketones, including halogenated ketones, e. g., methyl ethyl ketone, acetone, chloroacetones, etc.; nitriles, including halogenated nitriles, e. g., acrylonitrile, methacrylonitrile, acetonitrile, chloroacetonitriles, etc.; acylated ureas, including halogenated acylated ureas, e. g., acetyl urea, propionyl urea, chloroacetyl urea, etc.

Illustrative examples of other modifying bodies that may be incorporated into the resinous compositions of this invention are melamine-aldehyde condensation products (e. g., melamine-formaldehyde condensation products), urea-aldehyde condensation products (e. g., urea-formaldehyde condensation products), protein-aldehyde condensation products, aminodiazine-aldehyde condensation products, aminotriazole-aldehyde condensation products, aniline-aldehyde condensation products, phenol-aldehyde condensation products (e. g., phenol-formaldehyde condensation products), furfural condensation products, modified or unmodified, saturated or unsaturated polyhydric alcohol—polycarboxylic acid reaction products, ester gums, water-soluble cellulose derivatives, natural gums and resins such as shellac, rosin, etc., polyvinyl compounds such as polyvinyl alcohol, polyvinyl esters (e. g., polyvinyl acetate, polyvinyl butyrate, etc.), polyvinyl ethers, including polyvinyl acetals, e. g., polyvinyl formal, polyvinyl butyral, etc.

Coating compositions may be prepared from the thermosetting or potentially thermosetting resinous compositions of this invention alone or admixed with melamine-formaldehyde resins, urea-melamine-formaldehyde resins, fatty oil or fatty oil acid-modified alkyd resins, or other film-forming materials commonly used in protective-coating compositions. For example, a coating composition may be made containing, for instance, from 15 to 95 parts by weight of a thermosetting or potentially thermosetting resin of the kind with which this invention is concerned and from 85 to 5 parts of a fatty oil or fatty oil acid-modified alkyd resin, numerous examples of which are given, for example, in Moore Patent No. 2,218,474, issued October 15, 1940.

In the preparation of the coating compositions of this invention I prefer to interact (1) a triazine derivative of the kind embraced by Formula I, (2) an aldehyde, specifically formaldehyde, and (3) a monohydric alcohol, more particularly a primary monohydric alcohol. An alkylation reaction takes place, and an ether corresponding to the alkyl radical of the alcohol employed is formed. In such reactions I prefer to use n-butanol, but other primary monohydric alcohols may be employed, e. g., methanol, ethanol, n-propyl alcohol, isobutyl alcohol, etc.

Dyes, pigments, driers, curing agents, plasticizers, mold lubricants, opacifiers and various fillers (e. g., wood flour, glass fibers, asbestos, mineral wool, mica dust, powdered quartz, titanium dioxide, zinc oxide, talc, china clay, carbon black, etc.) may be compounded by conventional practice with the resinous materials of my invention, as desired or as conditions may require, in order to provide a coating, molding or other composition best adapted to meet a particular service use. For additional and more detailed information concerning the modifying ingredients that may be employed in producing coating compositions from my new resins, reference is made to the aforementioned Moore patent.

The modified and unmodified resinous compositions of this invention have a wide variety of uses. For example, in addition to their use in the production of coating and molding compositions, they may be employed as modifiers of other natural and synthetic resins. Thus, the thermoplastic resins may be used to improve the plasticity or flow characteristics of thermosetting resins which have insufficient or unsatisfactory plasticity during curing to an insoluble, infusible state, e. g., certain urea-formaldehyde resins where better flow during molding is desirable. This improved plasticity permits molding at lower pressures. The soluble resins of this invention also may be dissolved in solvents, e. g., benzene, toluene, xylene, amyl acetate, methyl ethyl ketone, butanol, etc., and used as laminating varnishes in the production of laminated articles wherein sheet materials, e. g., paper, cloth, sheet asbestos, glass cloth, etc., are coated or coated and impregnated with the resin solution, superimposed and thereafter united under heat and pressure. They also may be employed as an adhesive in making laminated plywood, as an impregnant of pulp preforms from which molded articles thereafter are made by subjecting the impregnated preform to heat and pressure, as impregnants for electrical coils and for other electrically insulating applications, for bonding together abrasive grains in the production of resin-bonded abrasive articles such, for instance, as grindstones, sandpapers, etc., in the manufacture of electrical resistors, etc. They also may be used for treating textile materials (e. g., cotton, linen, rayon and other cellulose-containing textiles, wool, silk and other natural or synthetic proteinaceous textiles, including nylon and textiles derived from casein, soyabeans, etc.), in filament, thread, yarn, fabric (woven or felted) or other form, in order to improve the properties of such textile materials, e. g., to increase the stiffness, to increase the service life, or otherwise to enhance the properties of the treated materials and to make them more useful or serviceable to the ultimate user. They also may be employed for treating leather in order to improve its appearance and physical properties.

I claim:

1. A composition of matter comprising the product of reaction of ingredients including (1) an aldehyde and (2) a compound represented by the general formula

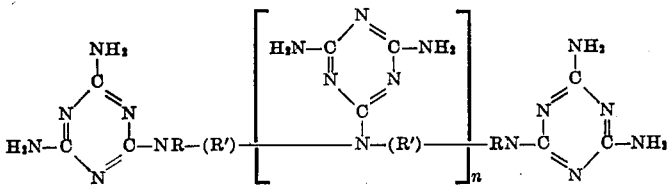

where R represents a member of the class consisting of hydrogen and monovalent hydrocarbon radicals, R' represents a divalent hydrocarbon radical bonded through carbon to nitrogen, and $n$ represents a small whole number.

2. A composition as in claim 1 wherein R represents hydrogen.

3. A composition as in claim 1 wherein R represents hydrogen and the aldehyde of (1) is formaldehyde.

4. A composition as in claim 1 wherein $n$ is 1.

5. A heat-curable resinous composition comprising a heat-convertible product of reaction of ingredients comprising (1) formaldehyde and (2) a compound represented by the general formula

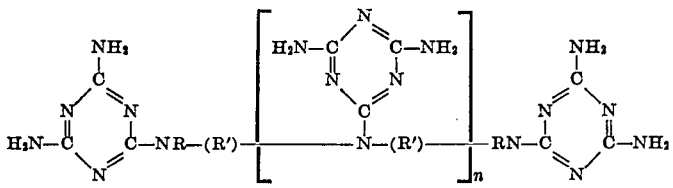

where R represents a member of the class consisting of hydrogen and monovalent hydrocarbon radicals, R' represents a divalent hydrocarbon radical bonded through carbon to nitrogen, and $n$ represents a small whole number.

6. A product comprising the cured resinous composition of claim 5.

7. A composition comprising the resinous condensation product of ingredients comprising an aldehyde and a dialkylenetrimelamine in which each alkylene grouping contains from 2 to 10 carbon atoms, inclusive.

8. A resinous composition comprising the product of reaction of ingredients comprising formaldehyde and diethylenetrimelamine.

9. A composition comprising a resinous product of reaction of ingredients including (1) an aldehyde, (2) an alcohol and (3) a compound represented by the general formula

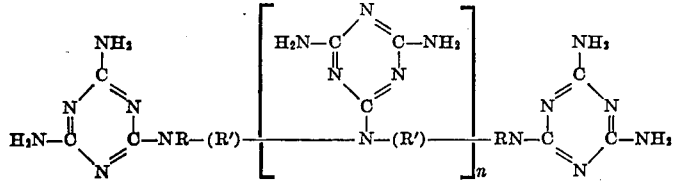

where R represents a member of the class consisting of hydrogen and monovalent hydrocarbon radicals, R' represents a divalent hydrocarbon radical bonded through carbon to nitrogen, and $n$ represents a small whole number.

10. A composition as in claim 9 wherein the aldehyde of (1) is formaldehyde and the alcohol of (2) is a monohydric alcohol.

11. A composition comprising a resinous product of reaction of ingredients including (1) an aldehyde, (2) urea and (3) a compound represented by the general formula

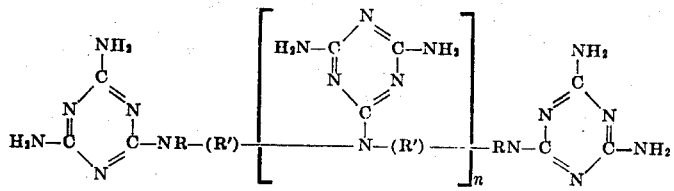

where R represents a member of the class consisting of hydrogen and monovalent hydrocarbon radicals, R' represents a divalent hydrocarbon radical bonded through carbon to nitrogen, and $n$ represents a small whole number.

12. A composition comprising a resinous product of reaction of ingredients including (1) an aldehyde, (2) melamine and (3) a compound represented by the general formula

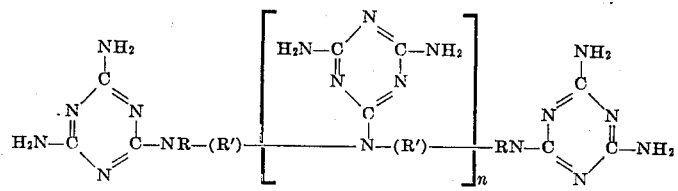

where R represents a member of the class consisting of hydrogen and monovalent hydrocarbon radicals, R' represents a divalent hydrocarbon radical bonded through carbon to nitrogen, and $n$ represents a small whole number.

13. The method of preparing new synthetic compositions which comprises effecting reaction, at a temperature within the range of from 20° C. to the reflux temperature of the reaction mass, between ingredients including (1) an aldehyde and (2) a compound represented by the general formula

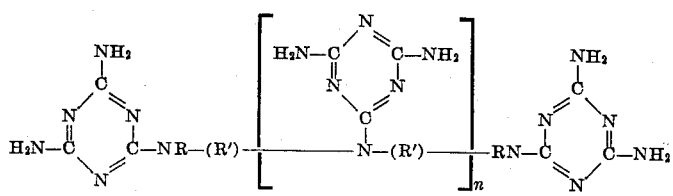

where R represents a member of the class consisting of hydrogen and monovalent hydrocarbon radicals, R' represents a divalent hydrocarbon radical bonded through carbon to nitrogen, and $n$ represents a small whole number.

14. A coating composition comprising the resinous product of reaction of ingredients comprising formaldehyde, n-butanol and diethylenetrimelamine.

15. A composition of matter comprising the product of reaction of ingredients including (1) an aldehyde and (2) a compound represented by the general formula

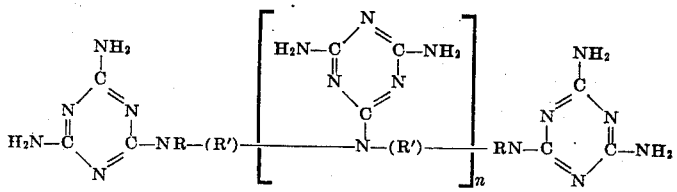

where R represents a member of the class consisting of hydrogen and monovalent hydrocarbon radicals, R' represents a divalent hydrocarbon radical bonded through carbon to nitrogen and containing from 2 to 14 carbon atoms, inclusive, and $n$ represents a small whole number.

16. A composition comprising a resinous product of reaction of ingredients comprising an aldehyde, an alcohol and a polyalkylenepolymelamine in which each alkylene grouping contains from 2 to 10 carbon atoms, inclusive, and the number of s-triazinyl nuclei in the said polyalkylenepolymelamine ranges from 3 to 7, inclusive.

17. A resinous composition comprising the product of reaction of ingredients comprising an aldehyde and a polyalkylenepolymelamine in which each alkylene grouping contains from 2 to 10 carbon atoms, inclusive, and the number of s-triazinyl nuclei in the said polyalkylenepolymelamine ranges from 3 to 7, inclusive.

18. A composition comprising a resinous condensation product of ingredients comprising an aldehyde and diethylenetrimelamine.

JAMES R. DUDLEY.

REFERENCES CITED

The following references are of record in the file of this patent:

UNITED STATES PATENTS

| Number | Name | Date |
|---|---|---|
| 2,197,357 | Widmer | Apr. 16, 1940 |
| 2,294,873 | D'Alelio | Sept. 1, 1942 |
| 2,328,957 | D'Alelio | Sept. 7, 1943 |
| 2,368,451 | D'Alelio | Jan. 30, 1945 |
| 2,394,526 | Thurston | Feb. 5, 1946 |

OTHER REFERENCES

Gams, British Plastics, February 1943, pages 508–520.

Moncrieff, Paint Manufacture, May 1947, pages 149–153.

Certificate of Correction

Patent No. 2,524,727

October 3, 1950

JAMES R. DUDLEY

It is hereby certified that error appears in the printed specification of the above numbered patent requiring correction as follows:

Column 2, line 3, for "xlylene" read *xylylene*; line 8, for the word "This" read *Thus*; column 3, line 44, for "-N-phenylene-" read *-N'-phenylene-*; column 4, line 41, for "diaguanamine" read *diguanamine*; line 46, for "beong" read *being*; column 13, line 13, for "mixture" read *mixtures*; line 71, for "sufonamides" read *sulfonamides*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*